June 10, 1930.  W. E. SYKES  1,763,332
UNIVERSAL SHAFT COUPLING
Filed Dec. 2, 1924  2 Sheets-Sheet 1
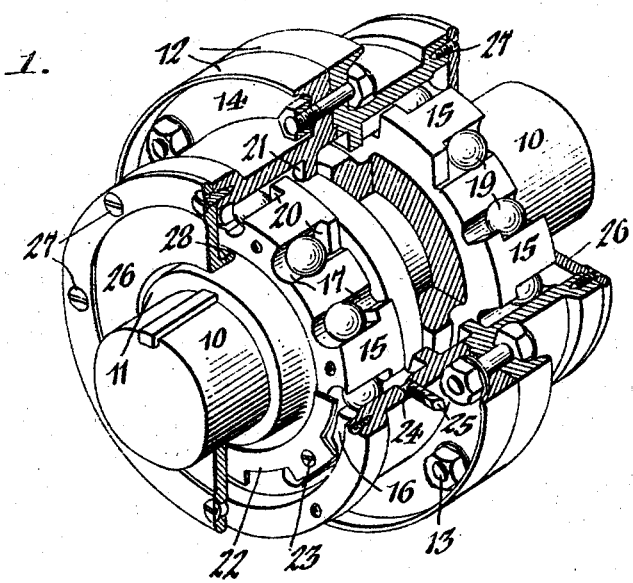
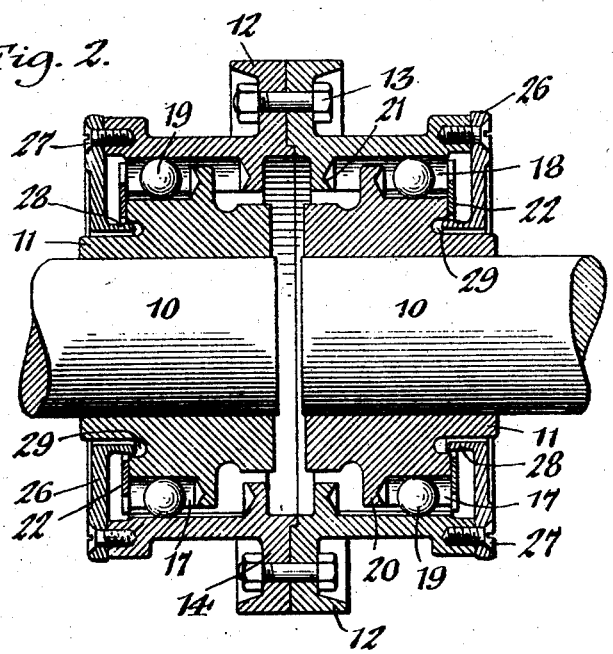
Inventor;
William E. Sykes,
by Geyer & Geyer
Attorneys.

June 10, 1930.  W. E. SYKES  1,763,332
UNIVERSAL SHAFT COUPLING
Filed Dec. 2, 1924  2 Sheets-Sheet 2

Inventor,
William E. Sykes,
by Geyer & Geyer
Attorneys.

Patented June 10, 1930

1,763,332

UNITED STATES PATENT OFFICE

WILLIAM E. SYKES, OF BUFFALO, NEW YORK

UNIVERSAL SHAFT COUPLING

Application filed December 2, 1924. Serial No. 753,458.

This invention relates to a flexible or universal coupling designed for connecting two shafts end to end.

One of its objects is to provide an improved coupling of this character which will permit free lateral or angular movement as well as axial movement of one shaft relative to the other.

Another object of the invention is the provision of a universal coupling which is simple, strong and durable in construction, which is reliable and efficient in operation, and which is composed of few parts, rendering it capable of manufacture at a moderate cost.

A further object is to provide the coupling with simple means for preventing leakage of lubricant therefrom.

Figure 3:
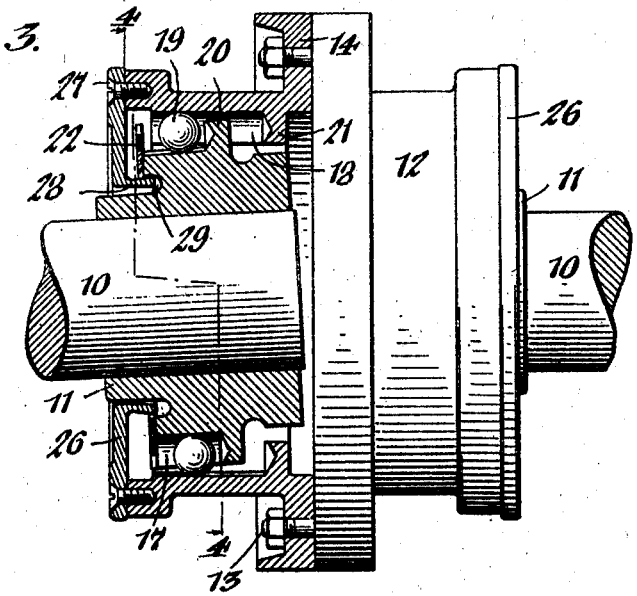
Figure 4:
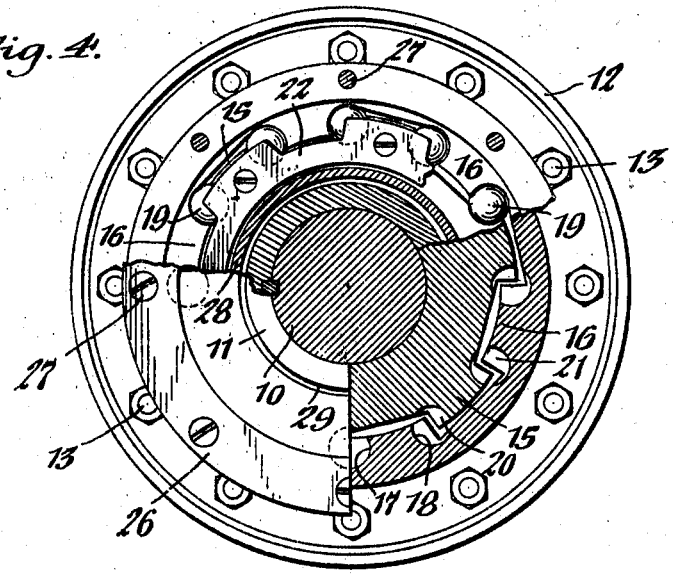

In the accompanying drawings:

Figure 1 is a perspective view, partly in section, of a shaft coupling embodying my improvements. Figure 2 is a central longitudinal section thereof, the shafts being in axial alinement. Figure 3 is a sectional elevation of the coupling, one of the shafts being shown out of alinement with the other. Figure 4 is a sectional end view of the coupling taken substantially in the plane of line 4—4, Fig. 3.

Similar characters of reference indicate corresponding parts throughout the several views.

The improved coupling is shown connecting two shafts 10, 10, on the opposing ends of which are mounted hubs or collars 11 which may be keyed or otherwise securely fastened thereto. Surrounding these hubs and bridging the space between the ends of the shafts is a sleeve or casing which is preferably divided transversely into two sections 12, 12 secured together by bolts 13 passing through flanges 14 at the inner ends thereof.

Each hub 11 is provided on the outer portion of its periphery with radial lugs or teeth 15 which are equally spaced, while the companion sleeve-section 12 is provided on its interior with corresponding radial lugs or teeth 16 which enter the spaces between the companion hub-lugs 15. The latter are provided in their opposite faces with substantially semi-cylindrical grooves or races 17, and the companion sleeve-lugs have similar substantially semi-cylindrical grooves or races 18 in their opposite faces. The opposing grooves of the companion sets of lugs together form cylindrical races for the reception of anti-friction members 19, such for example as balls, as shown. These lugs, together with the balls interposed between them, constitute the driving means for imparting rotary motion from one shaft to the other.

To retain the balls in the races, the latter are provided at their inner ends with stop shoulders 20 and 21 respectively, and at their outer ends with retaining rings 22 detachably secured to the outer ends of the hubs 11 by screws 23. If desired, however, these retaining rings may be permanently secured to the hubs by welding or otherwise. It will be observed that the ball-races are formed partly in the faces of the lugs and partly in the adjacent concentric portions of the shaft-hubs.

By this construction and arrangement, the balls and their interspaced lugs maintain the coupling sleeve, and the shaft-hubs in proper relation. The balls and lugs, while transmitting the driving thrust from one shaft to the other, permit the necessary universal angular or rocking movement of the shafts should they be misalined, the hubs and the sleeves being always fully interlocked and in perfect contact practically throughout their circumference regardless of the degree of misalinement or the direction in which the shafts are rotated.

As shown in Figs. 1, 2 and 3, the ball races 17, 18 are parallel with the axes of the respective hubs 11 and sleeve sections 12 and they are of sufficient length to permit an appreciable axial movement of one shaft relative to the other. Sufficient clearance is left between the ends of the lugs of one coupling-member and the opposing portions of the cooperating coupling member, as shown, to prevent contact of these parts.

One of the sleeve-sections 12 is preferably provided with an oil-filling hole 24 normally closed by a suitable plug 25, the coupling being filled with oil to a point below the bottom side of the extended end portions of the hubs 11. Annular cover plates 26 are applied to the outer ends of the coupling to prevent the escape of oil, each plate being secured to the respective sleeve-section by screws 27 or other appropriate fastenings. Each cover plate fits over the outer end of the corresponding hub 11 and has at its inner edge an annular, inwardly-facing flange or lip 28 which loosely engages a corresponding groove or recess 29 formed in the opposing end of said hub. This annular flange serves as a guard which intercepts the oil and prevents its leaking out of the coupling. As the coupling revolves, the oil is centrifugally thrown against the inner surface of the casing, thoroughly lubricating the balls 19 and their races 17, 18 minimizing the friction.

It will be observed that I have provided a three-member coupling, consisting of two hub members designed to be attached to the juxtaposed ends of the shafts to be coupled and the flanged sleeve member designed to embrace the hub members and to have a driving connection therewith through the interspaced lugs 15 and 16 by means of the balls 19. These lugs are arranged to overlap each other, and the complemental grooves forming the ball races are provided in the side edges of the lugs so that these grooves oppose each other laterally. Moreover, the diameter of these races is substantially equal to the height of the lugs, so that the anti-friction balls are under compression substantially throughout their diameters when the coupling is in use. When the ball races and balls are arranged between the side faces or laterally opposing faces of the lugs, it will be apparent that the driving motion is effected through one set of balls when the shaft is being driven in one direction, and is effected through another set of balls when the shaft is beng driven in the other direction, each set comprising alternate balls of the series.

The use of a three-member coupling of this character, permits one shaft to be driven from the other, although the shafts may not be parallel with each other. In addition to permitting axial misalignment of the shafts, the coupling also permits parallel misalignment of the shafts. That is, the axes of the shafts may be parallel with each other, but may be offset without their operation being interfered with.

While I have confined the description and drawings to a rotatable member spherical in form, it is to be understod that other than spherical members may be used, provided, of course, that the results obtained by such use will be substantially the same. That is to say, a member spherical in form permits relative movement betwen the parts substantially free from friction, both when in axial and parallel misalignment. A rotatable member may be interposed between the opposing lug which is not spherical in form, it being sufficient that the rotatable member be either rotatable about an axis radially disposed to the axis of the shaft, or about an axis substantially parallel to the axis of the shaft or both.

In accordance with the provisions of the statutes, I have described the principle of my invention together with the apparatus which I now consider to embody the best embodiment thereof, but I desire to have it understood that the apparatus is only illustrative, and that the invention can be carried out by other means.

I claim as my invention:

1. In a coupling for shafts or the like, a hollow casing having spaced apart internally and radially projecting lugs extending axially a portion of the length of said casing, a member adapted to be secured to a shaft and having peripheral lugs extending radially therefrom into the spaces between the lugs on said casing, said member being axially slidable within said casing, driving members between the opposed side surfaces of the lugs on said member and said casing, said driving means being freely rotatable on an axis radially disposed relatively to the axis of said casing and between the side surfaces of said lugs.

2. In a coupling for shafts or the like, a hollow casing having spaced apart internally and radially projecting lugs extending axially a portion of the length of said casing at each end thereof, a member adapted to be secured to a shaft or the like and having peripheral lugs extending radially therefrom and adapted to enter the spaces between the lugs on said casing at either end thereof, said member being longitudinally slidable within said casing, mobile means interposed between the opposed side surfaces of the lugs on said shaft member and said casing, said mobile members being freely rotatable on an axis disposed substantially parallel and rockable on an axis radially disposed with respect to the axis of said casing and between the side surfaces of said lugs.

3. In a coupling for shafts or the like, a hollow cylindrical casing and a hub member enclosed thereby, said casing having spaced apart depending lugs upon its internal periphery, said lugs having grooves in the side faces thereof extending axially parallel with the axis of said casing, said hub member having spaced apart outwardly extending lugs upon its periphery, the lugs upon said hub member being adapted to enter the spaces between the lugs on said casing and having grooves in the side faces thereof extending axially parallel with the axis of said hub member, and an independently rotatable member interposed between the opposing sides of each of said lugs within the grooves therein.

4. In a coupling for shafts or the like, a hollow casing and a hub member enclosed thereby, said casing having spaced apart depending lugs upon its internal periphery, said lugs having grooves in the side faces thereof extending axially parallel with the axis of said casing, said hub member having spaced apart outwardly extending lugs upon its periphery, the lugs upon said hub member being adapted to enter the spaces between the lugs on said casing and having grooves in the side faces thereof extending axially parallel with the axis of said hub member, and an independently rotatable member interposed between the opposing sides of each of said lugs within the grooves therein, said rotatable members being independently and axially movable relatively to said casing and said hub member.

5. In a coupling for shafts or the like, a hollow casing and a hub member enclosed thereby, said casing having spaced apart depending lugs upon its internal periphery, said lugs having grooves in the side faces thereof extending axially parallel with the axis of said casing, said hub member having spaced apart outwardly extending lugs upon its periphery, the lugs upon said hub member being adapted to enter the spaces between the lugs on said casing and having grooves in the side faces thereof extending axially parallel with the axis of said hub member, and an independently rotatable member interposed between the opposing sides of each of said lugs within the grooves therein, said rotatable members being independently and axially movable relatively to said casing and said hub member, and means to close the ends of the grooves in said hub member to retain the rotatable members therein.

6. In a coupling for shafts or the like, a sleeve member and a cylindrical member enclosed thereby, said sleeve member having spaced apart depending lugs upon its internal periphery whereby spaces are formed therebetween, said lugs having grooves in the side faces thereof extending axially of said member, said cylindrical member having spaced apart outwardly extending lugs upon its periphery, the lugs upon said cylindrical member being adapted to enter the spaces between the lugs on said sleeve member and having grooves in the side faces thereof extending axially of said cylindrical member and coinciding with the grooves in the lugs of said sleeve member, and a rotatable member interposed between the opposing sides of each of said lugs within the grooves therein.

7. In a coupling for shafts or the like, an outer casing and a shaft hub member enclosed thereby, said casing having spaced apart depending lugs upon its internal periphery, said hub member having spaced apart outwardly extending lugs upon its periphery, the lugs of said member being adapted to enter the spaces between the lugs in said casing whereby the side faces of the lugs on said members will be in opposed relation, and rotatable members interposed between the sides of said opposed lugs, and means at the inner ends of said lugs and at the outer ends thereof to retain said rotatable members against displacement from between said lugs.

8. In a coupling for connecting two shaft ends together, a hub member securable to each shaft end and having spaced apart upstanding lugs upon its periphery, an outer casing portion about each of said hub members having spaced apart depending lugs upon its interior periphery, said casing lugs being adapted to be received between the lugs and said hub members whereby the side surfaces of the lugs of the respective members will be in opposed relation, a rotatable member between the sides of the aforesaid opposed lugs to drivingly connect said hub member and said casing together, an outer end plate extending over the outer end of each hub member to retain the same against axial movement in one direction, means securing said end plate to the adjacent casing portion, and means to connect said casing portions together whereby each portion with its cooperating hub member and end plate is removable from the other without disturbing the other and its cooperating hub member and end plate.

9. In a coupling for shafts or the like, a hollow casing and a hub member enclosed thereby, said casing having spaced apart depending lugs upon its internal periphery, said hub member having spaced apart outwardly extending lugs upon its periphery, the lugs upon said hub member being adapted to enter the spaces between the lugs on said casing, a rotatable member interposed between the opposing sides of each of said lugs, said rotatable members being axially movable relatively to said casing and said hub member, and means to retain the rotatable members in position between said lugs.

10. In a flexible coupling, outer and inner driving and driven members each having alternately arranged recesses with the walls between the recesses of each member projecting into the recesses of the other member, each of said members being provided with curved longitudinally extending grooves opening laterally into the recesses and in alignment with and opposed to the grooves in the other member, and curved rolling members in the opposed grooves forming driving connections between the members.

11. In a shaft coupling, a driving member, a driven member, said members having alternately arranged recesses with the walls between the recesses of each member projecting into the recesses of the other member, thereby forming a series of pairs of circumferentially opposing walls, a curved member disposed between the walls of each pair, said curved members being freely rotatable on an axis disposed substantially parallel and rockable on an axis radially disposed with respect to one of said members, and forming a driving connection between said members, and means to retain said curved members in the aforesaid position.

WILLIAM E. SYKES.